United States Patent
Malekmohamadi et al.

(10) Patent No.: US 9,977,999 B2
(45) Date of Patent: May 22, 2018

(54) PAPER CLASSIFICATION BASED ON THREE-DIMENSIONAL CHARACTERISTICS

(71) Applicant: Hewlett-Packard Development Company, L.P., Houston, TX (US)

(72) Inventors: Hossein Malekmohamadi, Bristol (GB); Guy Adams, Stroud (GB); Stephen Pollard, Dursley (GB); Steven J. Simske, Ft. Collins, CO (US); Khemraj Emrith, Bristol (GB); Melvyn Smith, Bristol (GB); Lyndon Smith, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/110,027

(22) PCT Filed: Jan. 6, 2014

(86) PCT No.: PCT/US2014/010292
§ 371 (c)(1),
(2) Date: Jul. 6, 2016

(87) PCT Pub. No.: WO2015/102644
PCT Pub. Date: Jul. 9, 2015

(65) Prior Publication Data
US 2016/0335526 A1 Nov. 17, 2016

(51) Int. Cl.
*G06K 9/00* (2006.01)
*G06K 9/62* (2006.01)
(Continued)

(52) U.S. Cl.
CPC .......... *G06K 9/6277* (2013.01); *G06T 7/0004* (2013.01); *G06T 7/41* (2017.01);
(Continued)

(58) Field of Classification Search
None
See application file for complete search history.

(56) References Cited

U.S. PATENT DOCUMENTS 5,214,490 A * 5/1993 Abe .................... G01B 11/022
250/559.24
6,985,622 B2 1/2006 Hubel
(Continued)

FOREIGN PATENT DOCUMENTS

| JP | 2002-029120 A | 1/2002 |
| JP | 2001-124859 A | 6/2011 |
| WO | WO-2010010229 A1 | 1/2010 |

OTHER PUBLICATIONS

Coleman Jr, North, and Ramesh Jain. "Obtaining 3-dimensional shape of textured and specular surfaces using four-source photometry." Shape recovery. Jones and Bartlett Publishers, Inc., 1992.*
Alireza Targhi et al, "Texture Classification with Minimal Training Images", IEEE 2008.
Jiahua Wu et al, "Combining Gradient and Albedo Data for Rotation Invariant Classification of 3D Surface Texture", IEEE Int'l Conf on Computer Vision, 2003.
(Continued)

*Primary Examiner* — Sean Conner
(74) *Attorney, Agent, or Firm* — HP Inc. Patent Department

(57) ABSTRACT

Examples disclosed herein relate to classifying paper based on three-dimensional characteristics of the paper. For example, a representation of the three-dimensional characteristics of the paper may be created, and statistical summary information related to the three-dimensional characteristics of the paper may be determined based on the representation. The paper may be classified based on the statistical summary information.

18 Claims, 4 Drawing Sheets

(51) Int. Cl.
  *G06T 7/00* (2017.01)
  *H04N 1/23* (2006.01)
  *G06T 7/593* (2017.01)
  *G06T 7/41* (2017.01)

(52) U.S. Cl.
  CPC ........... *G06T 7/593* (2017.01); *H04N 1/2323* (2013.01); *G06T 2207/10012* (2013.01); *G06T 2207/10021* (2013.01); *G06T 2207/10152* (2013.01); *G06T 2207/20076* (2013.01); *G06T 2207/20081* (2013.01); *G06T 2207/20084* (2013.01); *G06T 2207/30124* (2013.01)

(56) References Cited

U.S. PATENT DOCUMENTS

| | | | |
|---|---|---|---|
| 7,130,573 | B2 | 10/2006 | Nakamori |
| 7,336,394 | B2 | 2/2008 | Tsujimoto |
| 8,396,384 | B2 | 3/2013 | Hayashihara et al. |
| 2006/0045356 | A1* | 3/2006 | Turtinen ............... G01N 33/346 382/225 |
| 2012/0314233 | A1 | 12/2012 | Yamada |
| 2013/0243455 | A1 | 9/2013 | Ishida et al. |
| 2013/0301913 | A1* | 11/2013 | Simske ............... G06K 9/00577 382/165 |
| 2016/0019686 | A1* | 1/2016 | Toskala ................ G01B 11/303 382/108 |

OTHER PUBLICATIONS

Johnson, Micah et al, "Micorgeometry Capture using an Elastomeric Sensor", ACM Trans on Graphics, v. 30(4), Article 46, Pub date Jul. 2011.

Kuparinen, Toni et al, "Paper Surface Topography Using Three-Light Photometric Stereo", Conf on Machine Vision Applications, May 16-18, 2007.

M.L. Smith et al, "Gradient space analysis of surface defects using a photometric stereo derived bump map", Image and Vision Computing, 17(1999), 321-332.

M.L. Smith, "The analysis of surface texture using photometric stereo acquisition and gradient space domain mapping", Image and Vision Computing, 17(1999) pp. 1009-1019.

Mikkilineni, A.K. et al, "Printer Forensics Using SVM Techniques", 2005.

Peter Hansson et al, "Topography and Reflectance Analysis of Paper Surfaces Using a Photometric Stereo Method", Optical Engineering, Sep. 1, 2000, v. 39(9), pp. 2555-2561.

Peter Hansson, "Topography and Reflectance Analysis of Paper Surfaces Using a Photometric Stereo Method", Opt. Eng 39(9), pp. 2555-2561, Sep. 2000.

Toni Kuparinen et al, "On Surface Topography Reconstruction from Gradient Fields", Image Processing 207, IEEE, Sep. 16-19, 2007.

William Clarkson et al, "Fingerprinting Blank Paper Using Commodity Scanners", IEEE Symposium on Security and Privacy, May 2009.

* cited by examiner

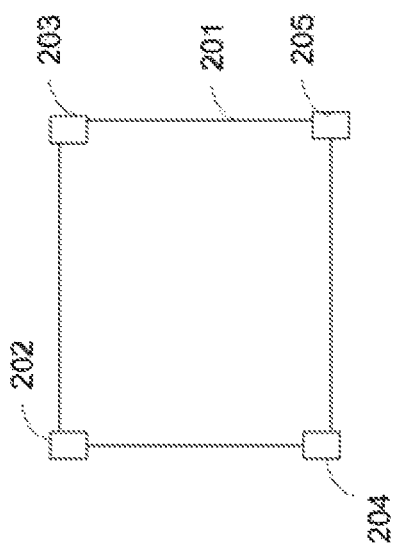
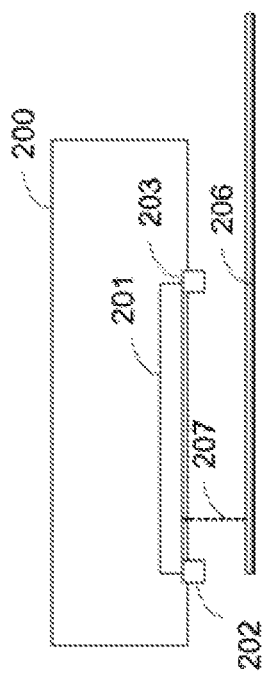

PAPER CLASSIFICATION BASED ON THREE-DIMENSIONAL CHARACTERISTICS

BACKGROUND

Printing may be performed on different types of paper substrates, such as labels, traditional paper, photographic paper, or card stock. The papers may have different topography from one another. For example, card stock with a glossy appearance may have a different surface texture than card stock with a more matte finish.

BRIEF DESCRIPTION OF THE DRAWINGS

The drawings describe example embodiments. The following detailed description references the drawings, wherein:

FIGS. 2A and 2B are diagrams illustrating one example of an imaging system to capture an image of paper to classify based on three-dimensional characteristics.

DETAILED DESCRIPTION

In one implementation, a paper is automatically classified according to three-dimensional characteristics of the paper. The classification may be performed based on a photometric stereo mapping of the paper created from images of the paper illuminated from different light sources. A three-dimensional representation of the paper may be determined based on the photometric stereo mapping of the paper. Summary information about the three-dimensional characteristics of the paper may be determined such that the paper may be more easily compared to classification information. For example, a machine-learning method may be performed to create a model for classifying paper, and the summary information may be classified according to the model.

Small topographical differences in paper may affect the way printed material appears on the paper. As such, it may be desirable to change the way content is printed based on the classification of the paper substrate. For example, color processing may be performed differently based on the paper classification. The amount of toner and/or ink may be adjusted according to the paper classification to alter the color processing.

Figure 1:
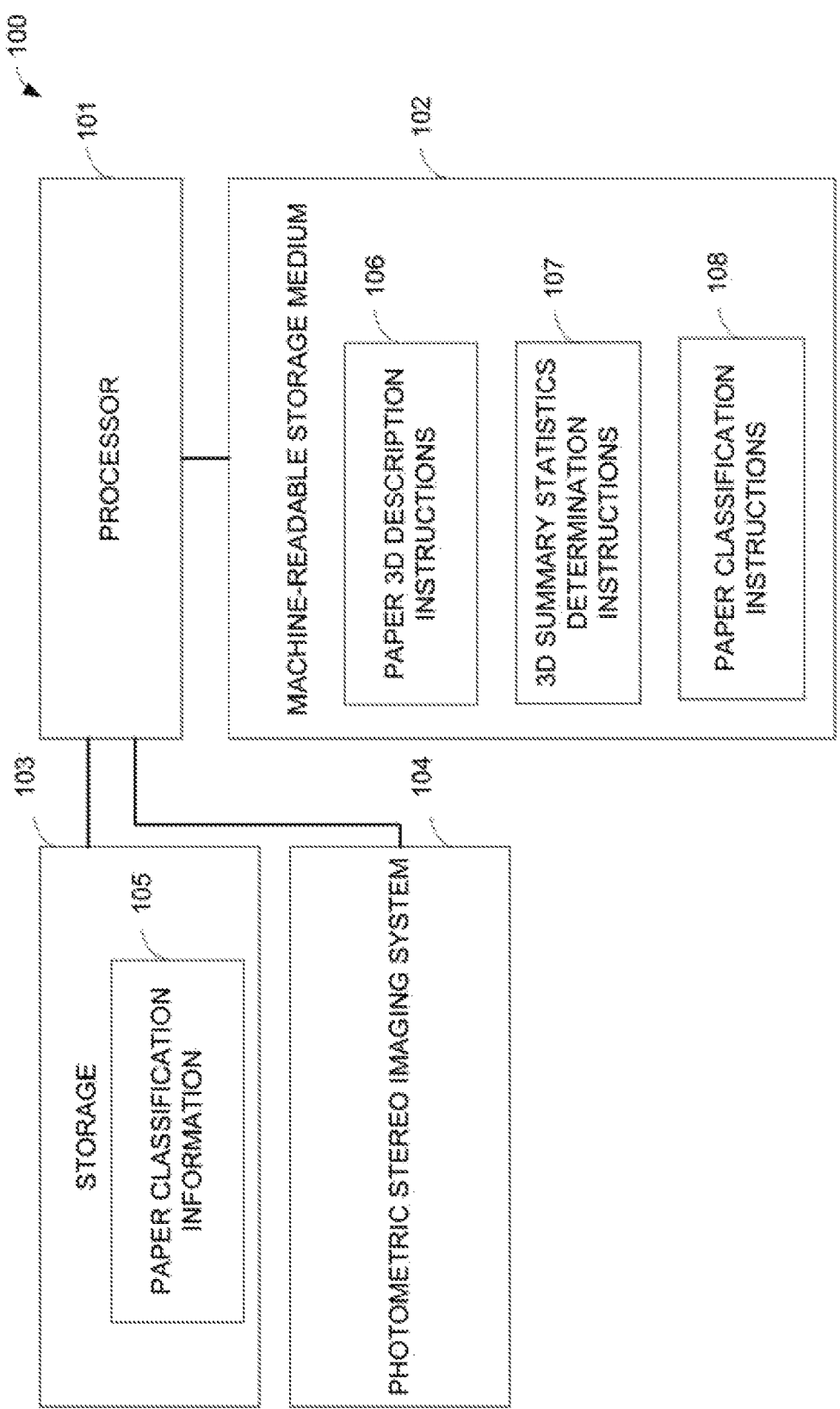
FIG. 1 is a block diagram illustrating one example of a computing system to classify paper based on three-dimensional characteristics.

FIG. 1 is a block diagram illustrating one example of a computing system to classify paper based on three-dimensional characteristics. For example, a paper printing substrate may be classified according to its topography, and print parameters may be selected based on the classification. The computing system 100 includes a processor 101, a machine-readable storage medium 102, a storage 103, and a photometric stereo imaging system 104.

The photometric stereo imaging system 104 may be used to estimate surface normals of paper based on images of the paper in different lighting conditions. The photometric stereo imaging system 104 may use any suitable camera. In one implementation, a Dyson relay lens with 1:1 magnification is used. It may use a fixed focal length and fixed focus contact device. The photometric stereo imaging system 104 may include an air gap between the imaging device and the target paper, such as a 4.5 mm gap. The gap may allow for more options for the illumination source positioning.

Illumination from different sources may prevent a directional component from a single light source giving a directional filtering effect. In some implementations, at least three light sources are used. For example, the photometric stereo imaging system 104 may include four light sources. The light sources may be, for example, light emitting diodes (LEDs). A light source may be placed at each of the corners of an input aperture of a relay lens associated with the photometric stereo imaging system 104. The light sources may be controlled independently such that they may illuminate together and/or some of the light sources may not be used. For example, a serial interface may be used to control the light sources. Multiple images of the target paper may be captured with three or more known illumination surfaces, and the images may be used to create a mapping of the surface slant and albedo of the target paper. The input images of the target paper used to create the mapping may be, for example, high dynamic range (HDR) images. As an example, the photometric stereo technique may be performed as disclosed by R. J. Woodham in "Photometric Method for Determining the Surface Orientation from Multiple Images" published in *Optical Engineering*, Volume 19 No. 1 in 1980.

FIGS. 2A and 2B are diagrams illustrating one example of an imaging system to capture an image of paper to classify based on three-dimensional characteristics. For example, Dyson relay lens 200 includes an additional external aperture 201. The aperture 201 includes 4 light sources 202, 203, 204, and 205. The Dyson relay lens 200 captures an image of paper 206 and has an air gap 207 from the aperture 201 and the paper 206. The air gap 207 may be, for example, 4.5 mm.

Referring back to FIG. 1, the storage 103 may be a storage for storing information accessible to the processor 101. For example, the storage 103 and processor 101 may be included in the same electronic device or may communicate via a network. The storage 103 may include paper classification information 105. The paper classification information 105 may relate to three-dimensional characteristics of paper. In one implementation, the paper classification information 105 is determined by the processor 101 or another processor. The paper classification information 105 may be determined based on a machine learning model applied to paper with known classifications. In one implementation, the paper classification information 105 is a neural network model for classifying paper printing substrates.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include instructions executable by the processor 101.

For example, the machine-readable storage medium 102 includes paper three-dimensional description instructions 106, three-dimensional summary statistics determination instructions 107, and paper classification instructions 108.

The paper three-dimensional description instructions 106 may include instructions to create a description of the three-dimensional characteristics of a paper. The paper may be paper, such as cardstock or labels, used as a printing substrate. A surface mapping of the three-dimensional characteristics of the paper may be determined from a surface normal map created from the photometric stereo imaging system 104. The description of the three-dimensional characteristics may be, for example, a shape index representing the three-dimensional shape of the paper at different locations along the paper. As an example, a shape index for indicating the topography of an object at different portions may be similar to the shape index described in "Surface Shape and Curvature Scales" published by J. J. and van Doom and A. J. Koenderink in *Image and Vision Computing*, Vol. 10 No. 8 in 1992.

The three-dimensional summary statistics determination instructions 107 may include instructions to summarize the description of the three-dimensional characteristics. For example, a more concise version of the description of the three-dimensional characteristics may be created to be used to classify the paper. The summary statistics may include, for example, contrast, energy, and/or entropy information related to the three-dimensional characteristics.

The paper classification instructions 108 may include instructions to classify the paper based on a comparison of the summary statistics of the paper to the paper classifying information 105. In some cases, the comparison may result in the paper being determined to be an unknown type, such as where the three-dimensional characteristics of the paper substrate do not resemble those of the categories.

In one implementation, the machine-readable storage medium 102 is associated with a printer, and instructions for classifying a paper printing substrate are executed when a paper is provided to the printer. The paper may be classified, and printer settings may be automatically determined based on the paper printing substrate.

Figure 3:
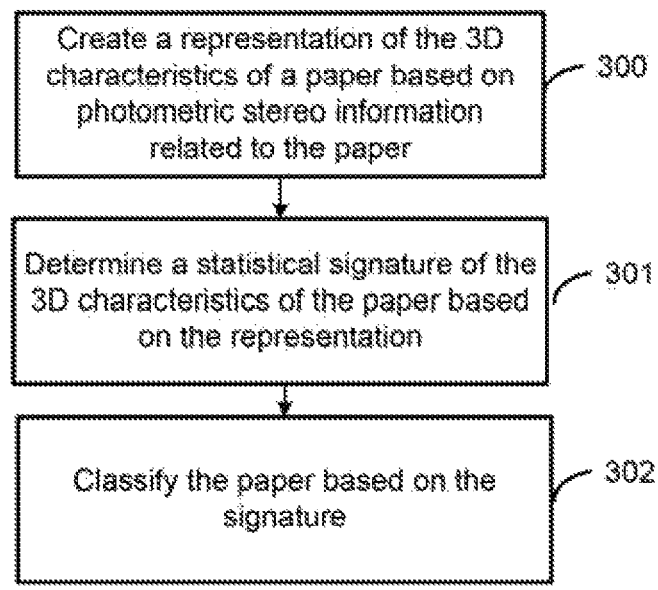
FIG. 3 is a flow chart illustrating one example of a method to classify paper based on three-dimensional characteristics.

FIG. 3 is a flow chart illustrating one example of a method to classify paper based on three-dimensional characteristics. For example, the classification may be based on photometric stereo information related to the paper. The paper may be classified based on a machine-learning model created from paper with known classifications, and the paper classification information may be used to adjust printer settings according to the topography of the paper. The method may be implemented, for example, by the processor 101 from FIG. 1.

Beginning at 300, a processor creates a representation of the three-dimensional characteristics of a paper based on photometric stereo information related to the paper. The paper may be, for example, a card, label, photographic paper, sheet of paper, box, or other paper substrate for printing. In one implementation, multiple images are captured using different illumination sources. For example, the paper may be illuminated using at least three light emitting diodes. In one implementation, a rectangular image of a portion of the paper is captured. Four light emitting diodes may be used such that a light source is associated with each of the four corners of the image.

In one implementation, the three-dimensional representation is created by analyzing curvature information related to the photometric stereo data. This may be performed, for example, by determining first order derivatives along the x-axis and y-axis, determining the mean of the first order derivatives, and determining principle curves from the mean curvature information. The principle curve information may be used to determine a shape index for the paper surface. The shape index may represent a data of curvature information of the paper surface. For example, the shape index may include an entry for representing the three-dimensional characteristic of each pixel or other portion of a shape map of the paper. In one implementation, the shape index S is formed by $$S = \frac{2}{\pi}\arctan\left(\frac{k_2 + k_1}{k_2 - k_1}\right)$$

Where $k_1$ and $k_2$ represent principal curvatures measured directly from the surface normals. The surface normals may be obtained from the photometric stereo data. The three-dimensional representation may include information about both the paper and ink or other items on the paper.

Continuing to 301, a processor determines a statistical signature of the three-dimensional characteristics of the paper based on the representation. The signature may provide a reduced amount of data that can be analyzed to classify the paper. The signature may be created by summarizing any relevant three-dimensional information associating with the paper. The information may include, for example, contrast, energy, and/or entropy of the paper. In one implementation, the signature is derived from a co-occurrence matrix related to relative changes in three-dimensional characteristics across the paper.

In one implementation, co-occurrence information may be extracted from a shape index map of the paper. The co-occurrence information may be determined in a horizontal and vertical direction for changes in patches, such as a pixel or set of pixels, of the shape index map. For example, the three-dimensional signature may include horizontal contrast, vertical contrast, horizontal energy, vertical energy, and entropy. A co-occurrence matrix may be derived from the shape index using a vertical or horizontal offset. Summarization contrast and energy values may be determined based on the co-occurrence matrix, and entropy may be measured directly from the shape index map.

Moving to 302, a processor classifies the paper based on the signature. In one implementation, the paper is classified according to a machine learning model. For example, a machine learning model, such as a neural network, may be created by classifying papers with known classifications. For example, multiple images using different illumination sources may be taken of a paper with a known type. The images may be taken of different locations of the paper and the different locations of the paper may be associated with different surface types. A portion of the sample papers may be used for training a neural network or other machine learning model, a portion for validation, and a portion for testing. The training features may include, for example, energy, contrast, and entropy. In some cases, the classification may indicate that the paper is in an uncategorized group, such as where the topography of the paper does not relate to any of the learned categories.

In one implementation, printing parameters are selected based on the three-dimensional characteristics of the paper. For example, color may appear differently on paper according to the topography of the paper. To account for differences in the texture of paper printing substrates, an International Color Code (ICC) profile may be associated with each of the paper categories. When the paper is categorized, the associated profile is used by the printer for printing on the paper.

In one implementation, the classification is used to identify the source of the paper and/or ink on the paper. For example, the different classifications may represent different sources. Classifying the paper may be used to confirm that the paper is associated with the expected source. If the paper is not associated with the expected source, counterfeiting may be expected. For example, the processor may output information indicating a level of likelihood of counterfeiting.

Figure 4:
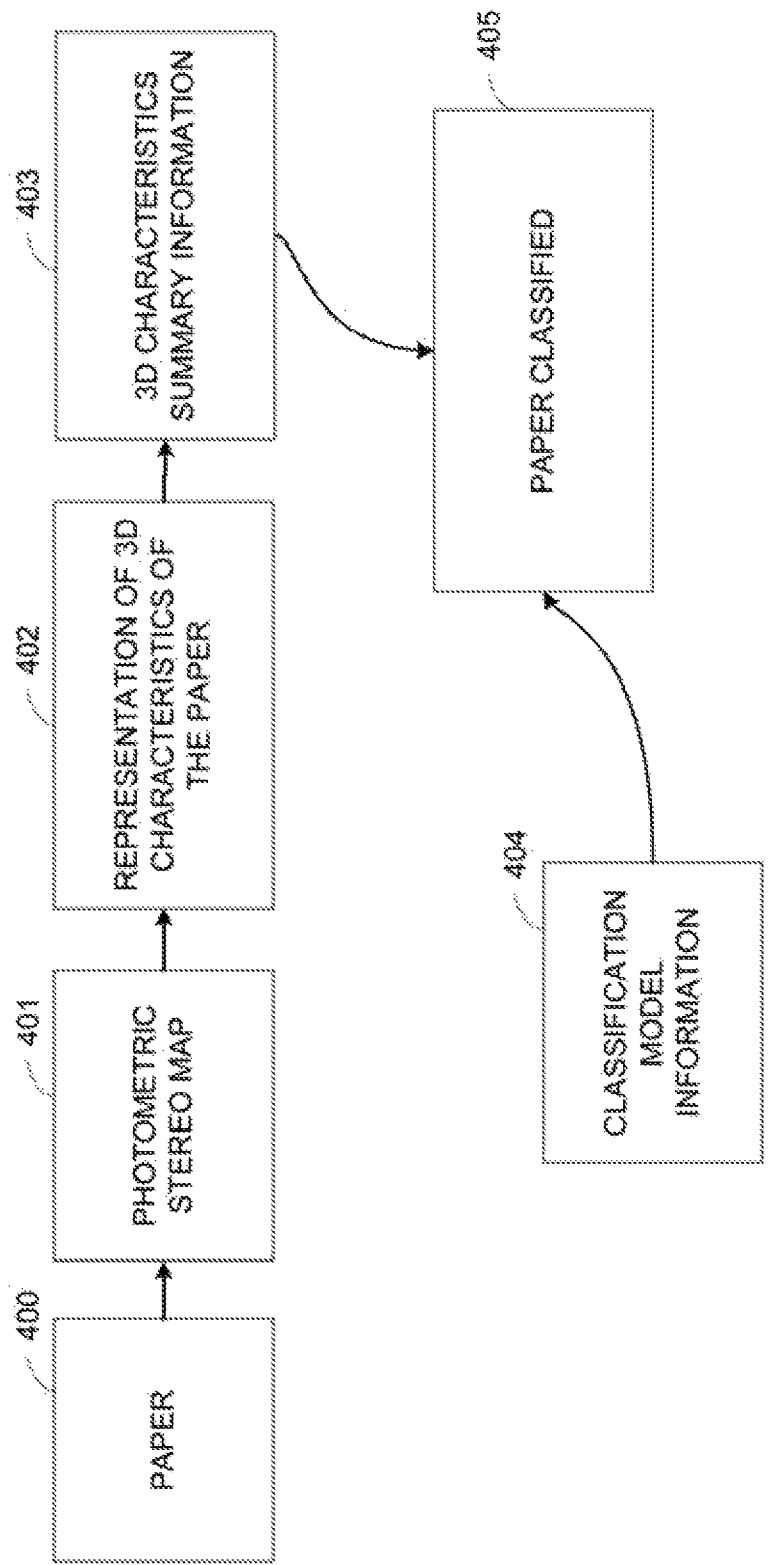
FIG. 4 is a diagram illustrating one example of classifying paper based on three-dimensional characteristics.

FIG. 4 is a diagram illustrating one example of classifying paper based on three-dimensional characteristics. At 400, paper is selected to be analyzed, for example, by a user inserting the paper into a printer. At 401, a processor creates a photometric stereo map of the paper. The photometric stereo map may be created from multiple images of the paper where each image is illuminated with a different position of a light source. At 402, information from the photometric stereo map is used to create a representation of the three-dimensional characteristics of the paper. For example, the representation may be a shape index map. At 403, the representation of three-dimensional characteristic information is used to summarize the three-dimensional characteristics of the paper. At 304, classification model information 304 and three-dimensional characteristics summary information 403 is used to classify the paper. The classification may be used, for example, to automatically adjust printer settings.

The invention claimed is:

1. A computing system, comprising:
   a photometric stereo imaging system with a rectangular input aperture and four light sources arranged with one at each corner of the aperture to capture multiple images of a printing substrate;
   a storage to store paper classification information related to three-dimensional statistics of printing substrate types; and
   a processor to:
   determine a description of the three-dimensional characteristics of a printing substrate based on images of the printing substrate captured by the photometric stereo imaging system;
   determine statistical summary information related to the three-dimensional characteristics description; and
   classify the printing substrate based on a comparison of the statistical summary information to the stored printing substrate classification information.

2. The computing system of claim 1, wherein the processor further:
   determines printing parameters based on the paper classification; and
   causes a printer to print on the printing substrate using the determined printing substrate parameters.

3. The computing system of claim 1, wherein classifying the printing substrate comprises associating the printing substrate with a category of unknown printing substrate type.

4. The computing system of claim 1, wherein the stored printing substrate classification information is determined based on a machine learning model applied to printing substrates with known classifications.

5. A method, comprising:
   collecting photometric stereo information with a photometric stereo imaging system having a rectangular input aperture and four light sources arranged with one at each corner of the aperture, the photometric stereo information comprising images of a printing substrate captured by the photometric stereo imaging system;
   creating, by a processor, a representation of three-dimensional characteristics of the printing substrate based on the photometric stereo information related to the printing substrate;
   determining a statistical signature of the three-dimensional characteristics of the printing substrate based on the representation;
   classifying the printing substrate based on the statistical signature as being one of labels, regular paper, photographic paper or cardstock;
   setting print parameters of a printer based on the classification of the printing substrate to improve print quality; and
   printing an image on the printing substrate using the print parameters set for the corresponding classification of printing substrate.

6. The method of claim 5, wherein creating a representation comprises creating a shape index indicating three-dimensional shape characteristics of the printing substrate.

7. The method of claim 5, wherein determining the signature comprises summarizing three-dimensional information related to at least one of contrast, energy, and entropy.

8. The method of claim 5, wherein determining the signature comprises creating a co-occurrence matrix related to relative changes in three-dimensional characteristics across the printing substrate.

9. The method of claim 5, further comprising performing a machine learning method to create a model to classify printing substrate types based on three-dimensional signatures of printing substrates with known classifications.

10. The method of claim 9, wherein classifying the printing substrate comprises classifying the paper according to the model.

11. The method of claim 9, wherein the machine learning method comprises a neural network.

12. A machine-readable non-transitory storage medium comprising instructions executable by a processor to:
   collect photometric stereo data with a photometric stereo imaging system having a rectangular input aperture and four light sources arranged with one at each corner of the aperture, the photometric stereo data comprising images of a paper captured by the photometric stereo imaging system;
   create a representation of three-dimensional characteristics of the paper based on the photometric stereo data related to the paper;
   determine statistical summary information related to the three-dimensional characteristics of the paper based on the representation;
   classify the paper based on the statistical summary information;
   set print parameters based on the classification of the paper to optimize print quality; and
   printing on the paper using the set print parameters.

13. The computing system of claim 1, wherein the photometric stereo imaging system further comprises a Dyson relay lens with 1:1 magnification arranged with an 4.5 mm air gap between the imaging system and a target printing substrate.

14. The computing system of claim 1, wherein the statistical summary information comprises all of horizontal contrast, vertical contrast, horizontal energy, vertical energy, and entropy.

15. The method of claim 5, further comprising collecting the photometric stereo information with a Dyson relay lens with 1:1magnification arranged with an 4.5 mm air gap between an imaging system and a target printing substrate.

16. The machine-readable non-transitory storage medium of claim 12, further comprising instructions to classify the paper based on the statistical summary information as being one of labels, regular paper, photographic paper or cardstock.

17. The machine-readable non-transitory storage medium of claim 12, wherein the statistical summary information comprises all of horizontal contrast, vertical contrast, horizontal energy, vertical energy, and entropy.

18. The machine-readable non-transitory storage medium of claim 12, the statistical summary information comprising a shape index representing data of curvature information of a surface of the paper including an entry representing three-dimensional characteristic of each pixel of a shape map of the paper.

* * * * *